US011756085B2

(12) United States Patent
Chang et al.

(10) Patent No.: US 11,756,085 B2
(45) Date of Patent: Sep. 12, 2023

(54) INTEGRATED SYSTEM OF PHYSICAL CONSUMPTION ENVIRONMENT AND NETWORK CONSUMPTION ENVIRONMENT AND CONTROL METHOD THEREOF

(71) Applicant: INDUSTRIAL TECHNOLOGY RESEARCH INSTITUTE, Hsinchu (TW)

(72) Inventors: Chih-Chia Chang, Zhubei (TW); Yu-Hsin Lin, Toufen (TW); Hsin-Yi Chen, Taichung (TW); Sen-Yih Chou, Hsinchu (TW); Yu-Ying Lan, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 390 days.

(21) Appl. No.: 16/728,232

(22) Filed: Dec. 27, 2019

(65) Prior Publication Data

US 2021/0065262 A1 Mar. 4, 2021

(30) Foreign Application Priority Data

Aug. 28, 2019 (TW) ................................. 108130840

(51) Int. Cl.
*G06Q 30/02* (2023.01)
*G06Q 30/0283* (2023.01)
(Continued)

(52) U.S. Cl.
CPC ....... *G06Q 30/0283* (2013.01); *G06K 7/1413* (2013.01); *G06Q 30/0238* (2013.01); *G06Q 30/0281* (2013.01); *G06V 40/10* (2022.01)

(58) Field of Classification Search
None
See application file for complete search history.

(56) References Cited

U.S. PATENT DOCUMENTS

2001/0042008 A1* 11/2001 Hull .................... G06Q 30/0242
705/26.1
2011/0258049 A1* 10/2011 Ramer ............... G06Q 30/0273
705/14.69

(Continued)

FOREIGN PATENT DOCUMENTS

CN 106981017 A 7/2017
CN 108062682 A 5/2018
(Continued)

*Primary Examiner* — Vincent M Cao
(74) *Attorney, Agent, or Firm* — Birch, Stewart, Kolasch & Birch, LLP

(57) ABSTRACT

An integrated system of a physical consumption environment and a network consumption environment and a control method thereof are provided. The control method of the integrated system of the physical consumption environment and the network consumption environment includes the following steps. A biological characteristic image of a consumer in the physical consumer environment is obtained. The biological characteristic image is identified to obtain an identity information from an identity database. An activity of the consumer in the physical consumption environment is detected. A product followed by the consumer and/or a physical behavior information are obtained according to the activity of the consumer in the physical consumption environment. A network behavior information of the consumer in the network consumer environment is obtained according to the identity information. A price of the product is dynamically adjusted according to the physical behavior information and the network behavior information.

16 Claims, 7 Drawing Sheets

(51) Int. Cl.
*G06K 7/14* (2006.01)
*G06V 40/10* (2022.01)
*G06Q 30/0238* (2023.01)

(56) References Cited

U.S. PATENT DOCUMENTS

| | | | |
|---|---|---|---|
| 2013/0024254 A1* | 1/2013 | Libenson | G06Q 30/02 705/14.1 |
| 2014/0067513 A1* | 3/2014 | Arora | G06Q 30/02 705/14.35 |
| 2015/0025936 A1* | 1/2015 | Garel | G06Q 30/0269 705/7.29 |
| 2016/0148235 A1* | 5/2016 | Hasei | G06Q 30/0206 705/7.35 |
| 2017/0140431 A1* | 5/2017 | Dwyer | G06Q 30/0261 |
| 2017/0228760 A1* | 8/2017 | Mason-Gugenheim | G06Q 20/3276 |
| 2018/0150861 A1 | 5/2018 | Megens | |
| 2018/0308155 A1 | 10/2018 | Kohli et al. | |
| 2019/0122170 A1 | 4/2019 | Soon-Shiong | |
| 2019/0311368 A1* | 10/2019 | Kim | H04W 4/023 |

FOREIGN PATENT DOCUMENTS

| | | | |
|---|---|---|---|
| CN | 109598533 A | | 4/2019 |
| CN | 109949141 A | | 6/2019 |
| CN | 110097378 A | | 8/2019 |
| CN | 110348869 A | * | 10/2019 |
| JP | 2018-138731 A | | 8/2018 |
| TW | M560634 U | | 5/2018 |
| TW | 201833844 A | | 9/2018 |
| TW | M567428 U | | 9/2018 |
| TW | M572017 U | | 12/2018 |
| TW | 201913510 A | | 4/2019 |
| TW | 201928840 A | | 7/2019 |
| WO | WO-2018203512 A1 | * | 11/2018 ........... B62B 5/0096 |

\* cited by examiner

INTEGRATED SYSTEM OF PHYSICAL CONSUMPTION ENVIRONMENT AND NETWORK CONSUMPTION ENVIRONMENT AND CONTROL METHOD THEREOF

This application claims the benefit of Taiwan application Serial No. 108130840, filed Aug. 28, 2019, the disclosure of which is incorporated by reference herein in its entirety.

TECHNICAL FIELD

The disclosure relates in general to an integrated system and a control method thereof, and more particularly to an integrated system of a physical consumption environment and a network consumption environment and a control method thereof.

BACKGROUND

Along with the advance in the network technology, the network consumption environment (Online) has gained a rapid advance. In the network consumption environment, the network behavior information of individual consumers may be recorded and relevant product discounts and suggestions may be provided to increase the consumers' consumption.

On the other hand, in the physical consumption environment (Offline), the prices are fixed, and tailor-made promotion may not be provided to individual consumers. It is common that the consumers may go to the physical consumption environment to gain a real experience but may make purchases in the network consumption environment. As a result, the sales volume in the physical consumption environment keeps declining. Therefore, how to integrate the network consumption environment and the physical consumption environment to form a full-access smart retailing (that is, the network consumption environment and the physical consumption environment (Online to Offline, O2O)), with which the consumer may gain an indifferent shopping experience and the sales volume in the physical consumption environment may be increased, has become a prominent task to the industries.

SUMMARY

The disclosure is directed to an integrated system of a physical consumption environment and a network consumption environment and a control method thereof.

According to one embodiment, a control method of an integrated system of a physical consumption environment and a network consumption environment is provided. The control method of an integrated system of a physical consumption environment and a network consumption environment includes the following steps. A biological characteristic image of a consumer in the physical consumer environment is obtained. The biological characteristic image is identified to obtain an identity information from an identity database. An activity of the consumer in the physical consumption environment is detected. A product to which the consumer and/or a physical behavior information are obtained according to the activity of the consumer in the physical consumption environment. A network behavior information of the consumer in the network consumer environment is obtained according to the identity information. A price of the product is dynamically adjusted according to the physical behavior information and the network behavior information.

According to another embodiment, an integrated system of a physical consumption environment and a network consumption environment is provided. The integrated system includes an image capture unit, an identity database, an identity identification unit, an activity detection unit, a product database, a product identification unit, a behavior analysis unit, a behavior database and a dynamic pricing unit. The image capture unit obtains a biological characteristic image of a consumer in the physical consumer environment. The identity identification unit identifies the biological characteristic image to obtain an identity information from an identity database. The activity detection unit detects an activity of the consumer in the physical consumption environment. The product identification unit obtains a product to which the consumer from the product database according to the activity of the consumer in the physical consumption environment. The behavior analysis unit obtains the physical behavior information of the consumer according to the activity of the consumer in the physical consumption environment. The behavior database provides a network behavior information of the consumer in the network consumer environment according to the identity information. The dynamic pricing unit dynamically adjusts the price of the product according to the physical behavior information and the network behavior information.

The above and other aspects of the disclosure will become better understood with regards to the following detailed description of the non-limiting embodiment(s). The following description is made with reference to the accompanying drawings.

Figure 1:
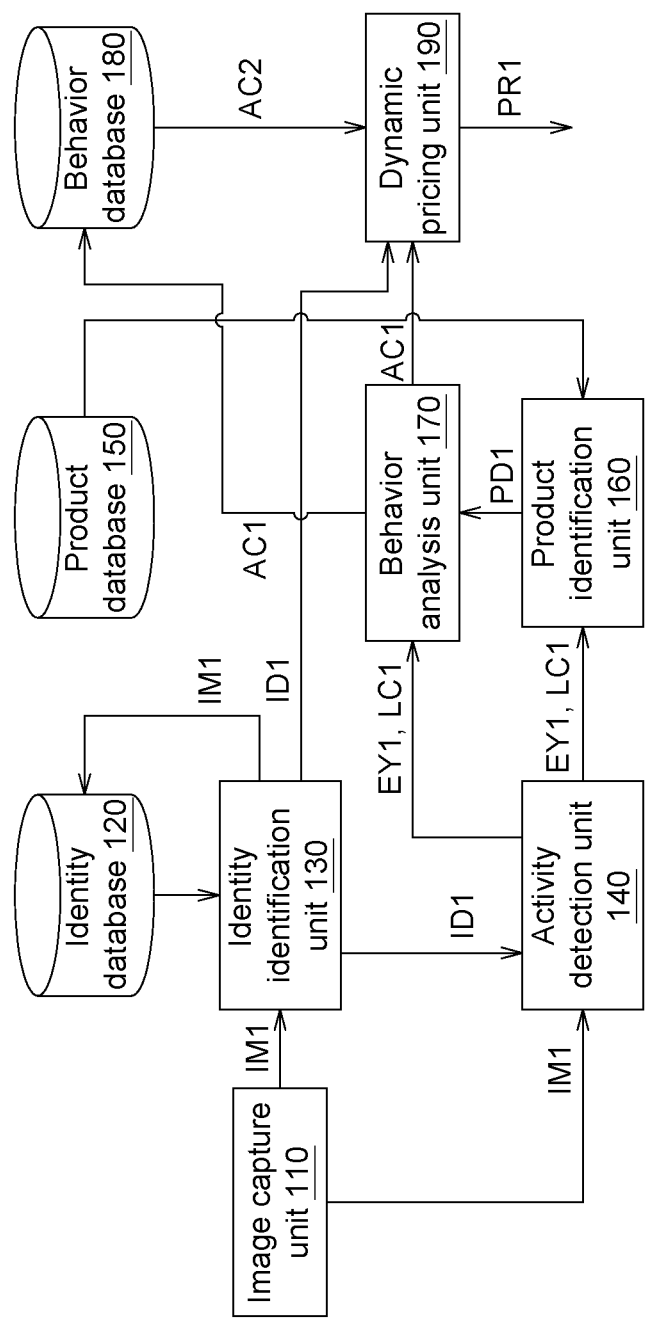
FIG. 1 is a schematic diagram of an integrated system of a physical consumption environment and a network consumption environment according to an embodiment of the disclosure.

In the following detailed description, for purposes of explanation, numerous details are set forth in order to provide a thorough understanding of the disclosed embodiments. It will be apparent, however, that one or more embodiments may be practiced without these details. In other instances, well-known structures and devices are schematically shown in order to simplify the drawing.

DETAILED DESCRIPTION

Referring to FIG. 1, a schematic diagram of an integrated system 100 of a physical consumption environment and a network consumption environment according to an embodiment of the disclosure is shown. The integrated system 100 may integrate the information of the physical consumption environment and the network consumption environment to increase the sales volume in the physical consumption environment. In an embodiment, the integrated system 100 includes an image capture unit 110, an identity database 120, an identity identification unit 130, an activity detection unit 140, a product database 150, a product identification unit 160, a behavior analysis unit 170, a behavior database 180 and a dynamic pricing unit 190. The image capture unit 110 may be realized by such as a video recorder or a camera for capturing an image. The identity database 120, the product database 150 and the behavior database 180 may be realized by such as a memory, a hard disc or a cloud information center for storing various data. The identity identification unit 130, the activity detection unit 140, the product identification unit 160, the behavior analysis unit 170 and the dynamic pricing unit 190 may be realized by an element equipped with computing processing function such as a circuit, a chip, a circuit board or a recording device storing programming codes. The operations of the above elements are disclosed below with a flowchart.

Figure 2:
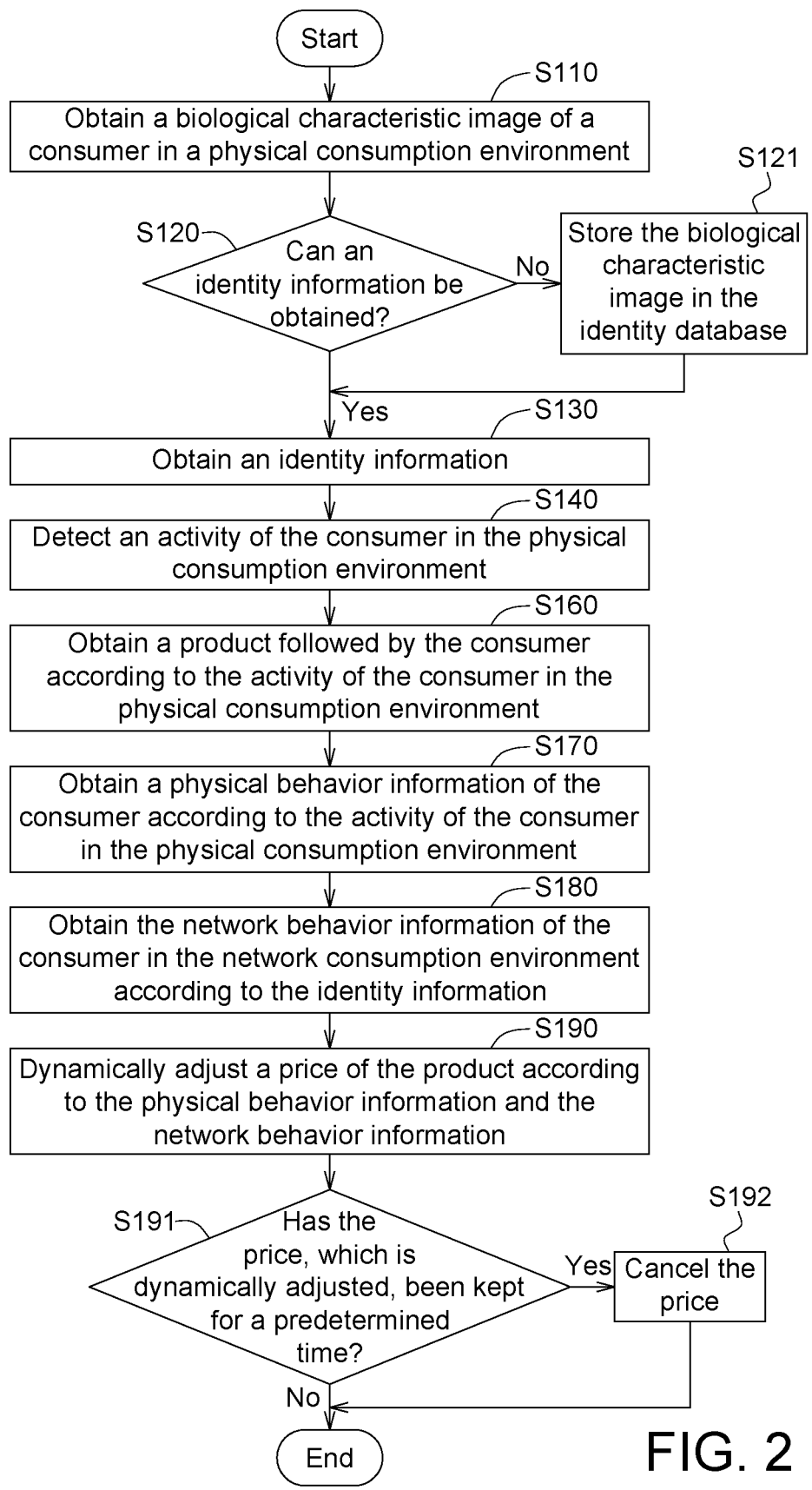
FIG. 2 is a flowchart of a control method of an integrated system according to an embodiment of the disclosure.
Figure 3:
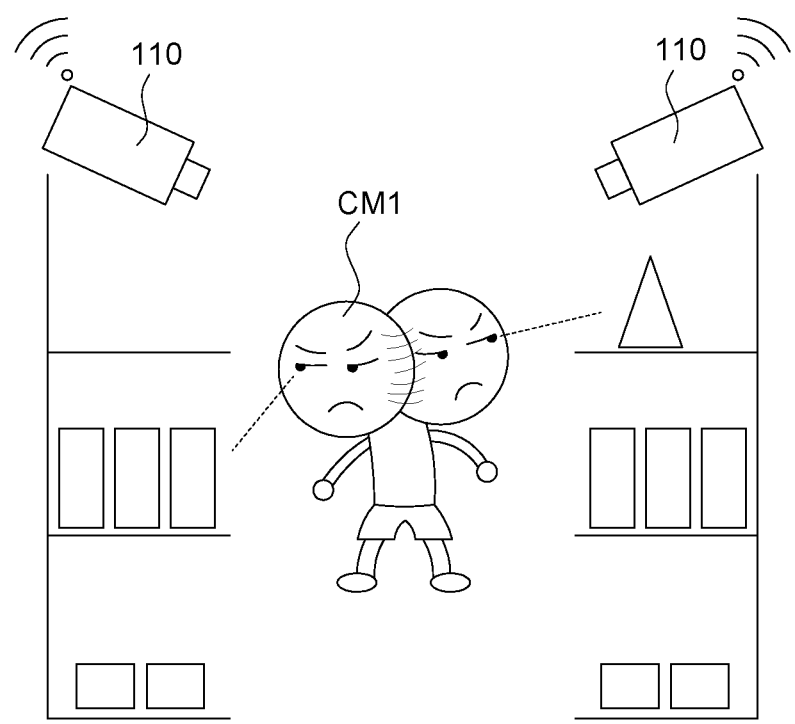
FIG. 3 is a schematic diagram of a physical consumption environment according to an embodiment of the disclosure.

Refer to FIG. 1 and FIG. 2. FIG. 2 is a flowchart of a control method of an integrated system 100 according to an embodiment of the disclosure. The control method of the integrated system 100 identifies and detects the physical consumption environment to obtain a physical behavior information AC1, and further combines the physical behavior information AC1 with a network behavior information AC2 of the network consumption environment to dynamically adjust a price. In step S110, a biological characteristic image IM1 of a consumer CM1 (illustrated in FIG. 3) in the physical consumption environment is obtained by the image capture unit 110, wherein the biological characteristic includes face, fingerprint, iris, vein, palm print and palm shape. Referring to FIG. 3, a schematic diagram of a physical consumption environment according to an embodiment of the disclosure is shown. In the physical consumption environment, the image capture unit 110 may be disposed on the shelf for shooting the consumer. Multiple image capture units 110 may be disposed in the physical consumption environment.

In step S120, the biological characteristic image IM1 is identified by the identity identification unit 130 to check whether an identity information ID1 may be obtained from an identity database 120. If the identity database 120 already stores the biological characteristic image IM1 and corresponding identity information of the consumer CM1, the identity identification unit 130 may obtain the identity information ID1, and the method proceeds to step S130. If the identity database 120 does not store the biological characteristic image IM1 or corresponding identity information of the consumer CM1, the identity identification unit 130 cannot obtain the identity information ID1, and the method proceeds to step S121.

In step S121, the biological characteristic image IM1 of the consumer CM1 is stored in the identity database 120 by the identity identification unit 130.

In step S130, the biological characteristic image IM1 is identified by the identity identification unit 130 to obtain the identity information ID1, such as a network login account or a membership account, from an identity database 120. The network login account may be an integrated account of multiple network consumption platforms.

In step S140, an activity of the consumer CM1 in the physical consumption environment is detected by the activity detection unit 140. For example, the activity detection unit 140 may analyze the biological characteristic image IM1 by tracking a sight EY1 of the consumer CM1. Or, the activity detection unit 140 may obtain a location LC1 of the consumer CM1 according to the fixed position, the GPS, the WIFI, the Bluetooth, the RFID, the UWB, or the ZigBee set by the image capture unit 110 to track the shopping hotspots. The sight EY1 or the location LC1 may be used to obtain the product (refer to step S160) followed by the consumer CM1 and the physical behavior information AC1 (refer to step S170). The physical behavior information AC1 includes the visit frequency, visit time, historic consumption record, amount, category and quantity of the product as well as the age and gender of the consumer CM1.

In step S160, a product PD1 followed by the consumer CM1 is obtained by the product identification unit 160 according to the activity (such as the sight EY1 or the location LC1) of the consumer CM1 in the physical consumption environment. For example, the product database 150 records the name, category, quantity and location of the product PD1 according to the product database 150; the product identification unit 160 estimates the destination of the sight EY1 of the consumer CM1 according to the sight EY1 to obtain the product PD1 that the consumer CM1 is viewing. Or, the product identification unit 160 obtains that the consumer CM1 is at the display area of the product PD1 according to the location LC1.

In step S170, the physical behavior information AC1 of the consumer CM1 is obtained by the behavior analysis unit 170 according to the activity (such as the sight EY1, location LC1, product attention, or emotion of the consumer) of the consumer CM1 in the physical consumption environment. For example, the behavior analysis unit 170 may obtain whether the consumer CM1 is following a particular product or a particular advertisement according to the sight EY1. Or, the behavior analysis unit 170 may obtain whether the consumer CM1 repeatedly watches and/or compares some products according to the sight EY1. The image capture unit 110 may identify the consumer's attention or emotion towards a product by locking his/her face and observe the texture, muscle and change in his/her facial expression.

Or, the behavior analysis unit 170 may obtain which product category the consumer CM1 is following according to the location LC1. The collectable physical behavior information AC1 has a wide range, and is not limited to the above exemplifications in the present disclosure. Besides, the physical behavior information AC1 may be stored in the behavior database 180. The physical behavior information AC1 and the network behavior information AC2 stored in the behavior database 180 may be continuously accumulated and updated.

In step S180, the network behavior information AC2 of the consumer CM1 in the network consumption environment is obtained by the dynamic pricing unit 190 according to the identity information ID1. The network behavior information AC2 is such as the product that the consumer CM1 has ordered, the webpage that the consumer CM1 has browsed, the key word that the consumer CM1 has searched, or the historic consumption record, amount, category, quantity and visit frequency of the product.

In step S190, a price PR1 of the product PD1 is dynamically adjusted by the dynamic pricing unit 190 according to the physical behavior information AC1 and the network behavior information AC2. For example, if the consumer CM1 repeatedly follows two kinds of coffee beans, discount may be applied to the one with greater profit. If the consumer still does not place an order over a period of time, a small price rise may be applied (keep the discount) to urge the consumer CM1 to purchase. Also, special offer may be given to frequent or indecisive consumer CM1.

Figure 4:
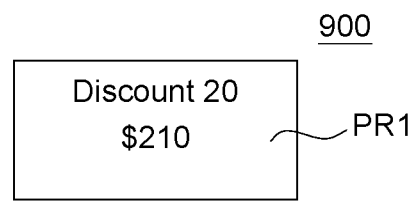
FIG. 4 is a schematic diagram of an electronic label according to an embodiment of the disclosure.
Figure 5:
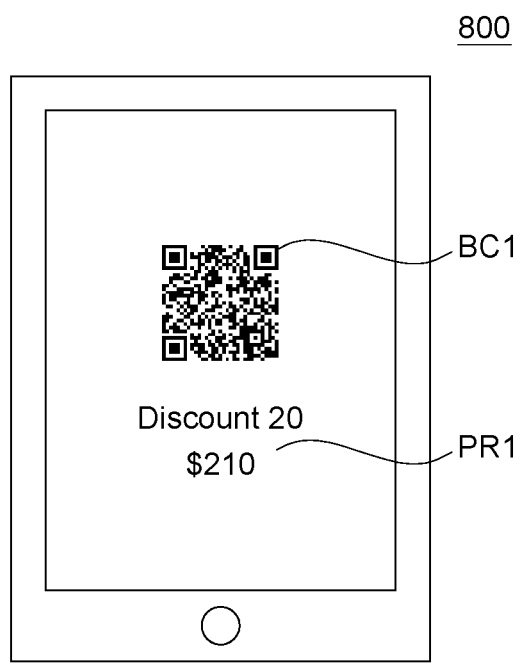
FIG. 5 is a schematic diagram of a mobile device according to an embodiment of the disclosure.

In an embodiment, the price PR1 may be displayed on an electronic label in the physical consumption environment or a mobile device of the consumer. Referring to FIG. 4, a schematic diagram of an electronic label 900 according to an embodiment of the disclosure is shown. The electronic label 900 may directly change the price PR1 and inform the consumer of the discounted amount. Referring to FIG. 5, a schematic diagram of a mobile device 800 according to an embodiment of the disclosure is shown. The dynamic pricing unit 190 may generate a checkout barcode BC1 corresponding to the dynamically adjusted price PR1. The checkout barcode BC1 may be displayed on a mobile device 800, an electronic label 900 or any other suitable carrier. When settling the account, the consumer CM1 may show the checkout barcode BC1 to obtain discount. In the physical consumption environment, the consumer CM1 may also settle the account online by use of a third-party payment. Furthermore, if the physical consumption environment allows facial recognition payment or checkout, the consumer CM1 only needs to express his/her purchase intention before the product PD1 by use of a particular gesture, the price PR1 and the consumer CM1 will be matched and the payment will be directly done over the counter.

In an embodiment, when deciding the price PR1, the dynamic pricing unit 190 may consider price sensitivity factors such as the price comparability, substitutes, cost of product conversion, price variability, importance, uniqueness, use, and brand of the product.

In step S191, whether the dynamically adjusted price PR1 has been kept for a predetermined time is determined by the dynamic pricing unit 190. If it is determined that the dynamically adjusted price PR1 has been kept for a predetermined time, the method proceed to step S192, and the price PR1 is cancelled. That is, the dynamically adjusted price PR1 may be kept for a predetermined time. For example, the policy of "the quicker the placement and payment of the order, the larger the discount" may urge the consumer CM1 to make consumption.

In another embodiment, the dynamic pricing unit 190 may further provide a promotional combination according to the physical behavior information AC1 and the network behavior information AC2. For example, the physical behavior information AC1 shows that the consumer CM1 is particularly interested in coffee beans but is indecisive, and the network behavior information AC2 shows that the consumer CM1 once inquired about coffee machine. Therefore, the dynamic pricing unit 190 may provide a promotional combination of coffee beans and coffee machine.

Figure 6:
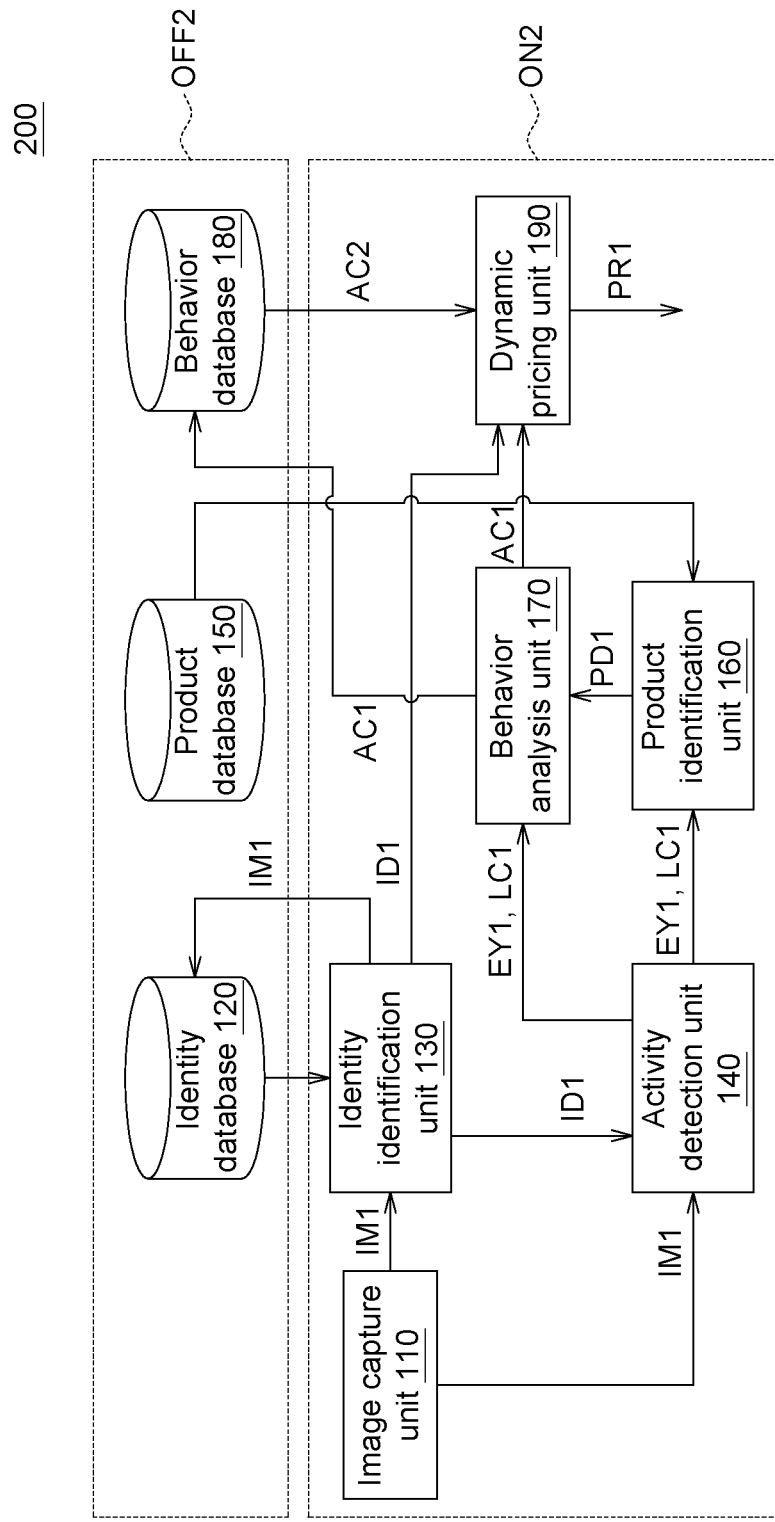
FIG. 6 is a schematic diagram of an integrated system of a physical consumption environment and a network consumption environment according to an embodiment of the disclosure.

The integrated system 100 of a physical consumption environment and a network consumption environment according to the above embodiments may integrate the information of a physical consumption environment and a network consumption environment to increase the sales volume in the physical consumption environment. The elements of the integrated system 100 are not restricted to be disposed in a remote end or a near end. Referring to FIG. 6, a schematic diagram of an integrated system 200 of a physical consumption environment and a network consumption environment according to an embodiment of the disclosure is shown. In the integrated system 200, the image capture unit 110, the identity identification unit 130, the activity detection unit 140, the product identification unit 160, the behavior analysis unit 170 and the dynamic pricing unit 190 are disposed in a near-end computing device ON2;

the identity database 120, the product database 150 and the behavior database 180 are disposed in a remote-end computing device OFF2. That is, the remote-end computing device OFF2 maybe a cloud data center, and the near-end computing device ON2 may access the data of the remote-end computing device OFF2 via the network.

Figure 7:
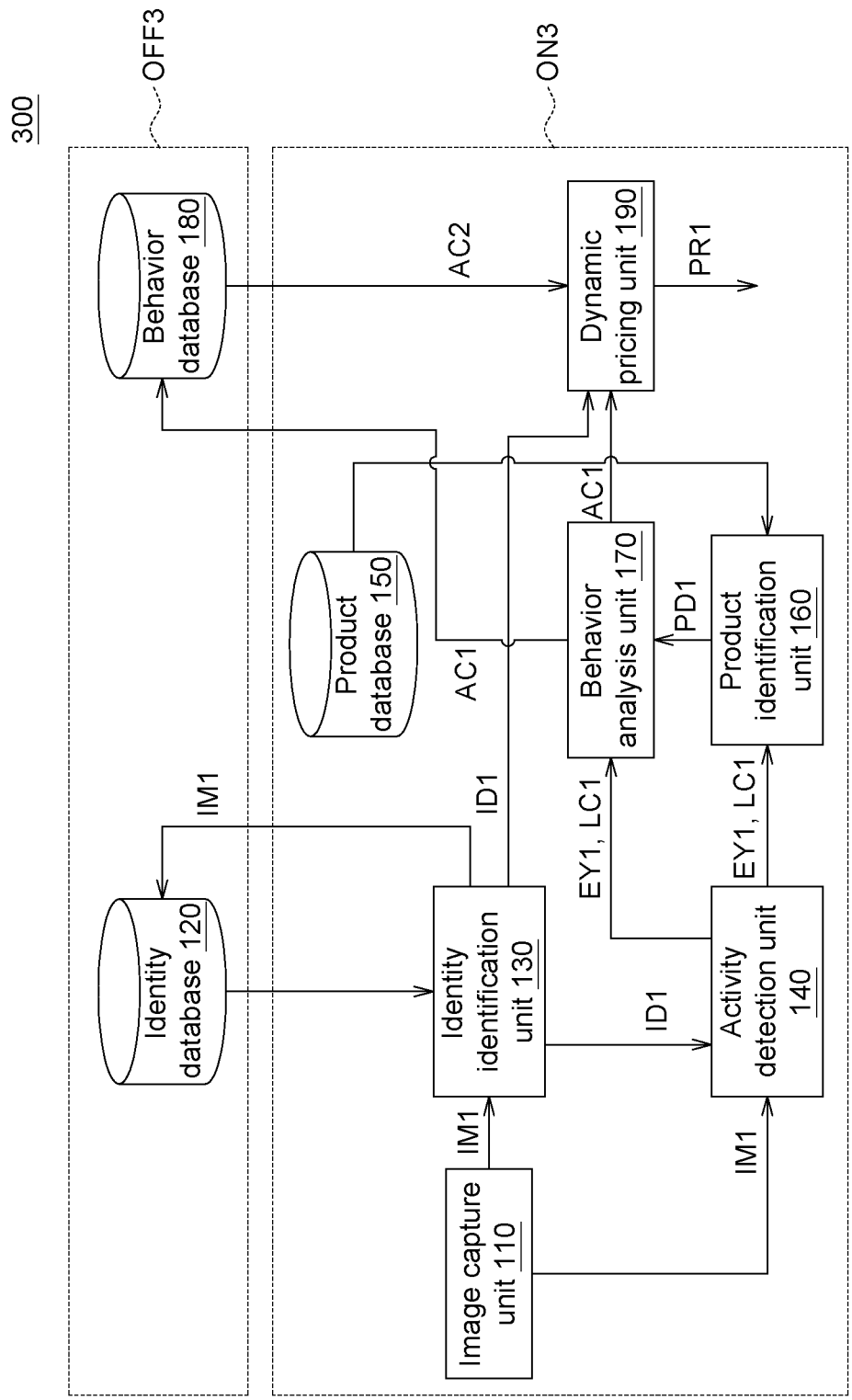
FIG. 7 is a schematic diagram of an integrated system of a physical consumption environment and a network consumption environment according to an embodiment of the disclosure.

Referring to FIG. 7, a schematic diagram of an integrated system 300 of a physical consumption environment and a network consumption environment according to an embodiment of the disclosure is shown. In the integrated system 300, the image capture unit 110, the identity identification unit 130, the activity detection unit 140, the product database 150, the product identification unit 160, the behavior analysis unit 170 and the dynamic pricing unit 190 are disposed in a near-end computing device ON3; the identity database 120 and the behavior database 180 are disposed in a remote-end computing device OFF3. That is, in the present embodiment, the product database 150 is disposed in the near-end computing device ON3, such that the physical shop manager may conveniently perform commodity logistics management such as the update information or stock replenishment of the products.

Figure 8:
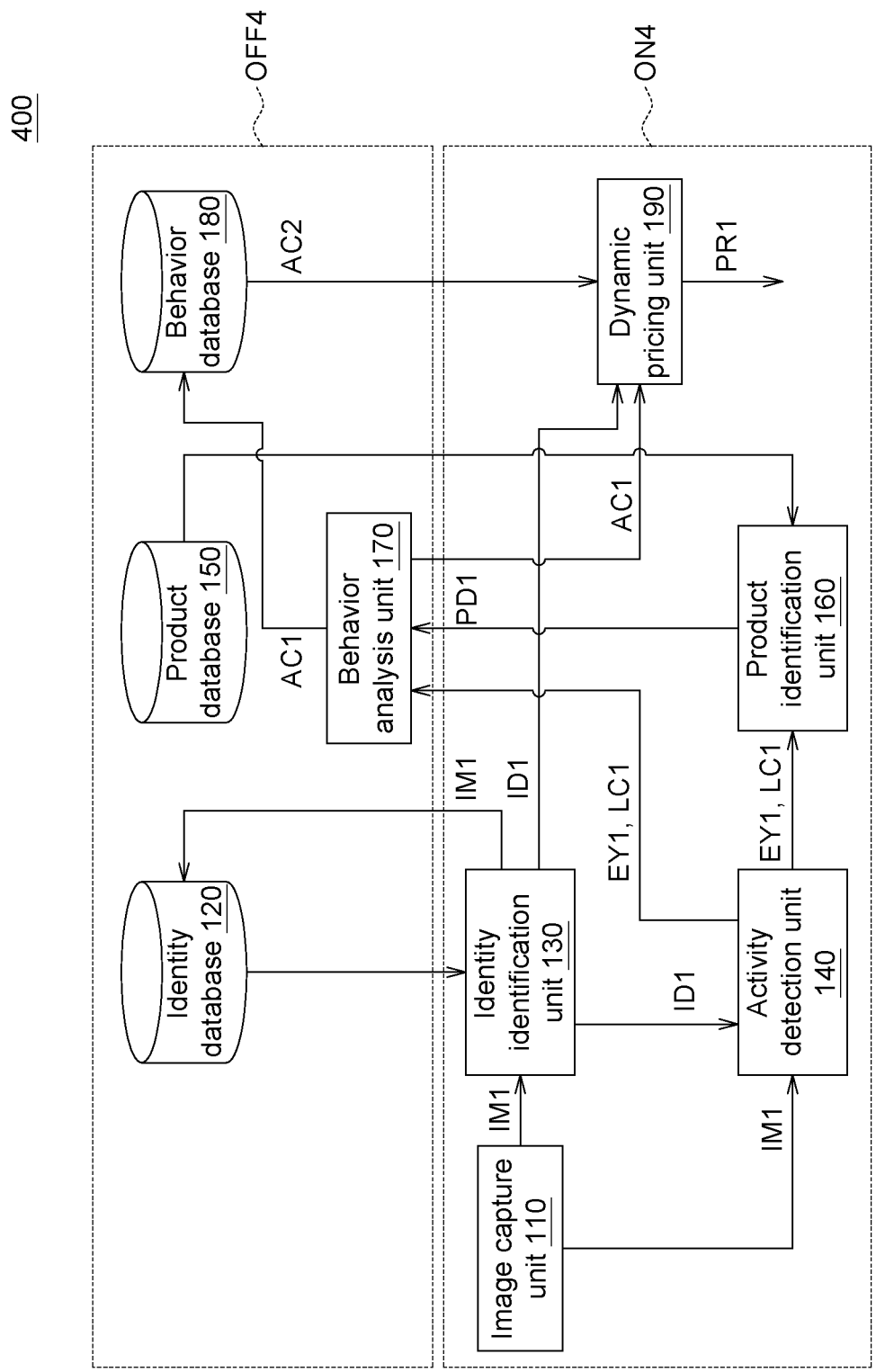
FIG. 8 is a schematic diagram of an integrated system of a physical consumption environment and a network consumption environment according to an embodiment of the disclosure.

Referring to FIG. 8, a schematic diagram of an integrated system 400 of a physical consumption environment and a network consumption environment according to an embodiment of the disclosure is shown. In the integrated system 400, the image capture unit 110, the identity identification unit 130, the activity detection unit 140, the product identification unit 160 and the dynamic pricing unit 190 are disposed in a near-end computing device ON4; the identity database 120, the product database 150, the behavior analysis unit 170 and the behavior database 180 are disposed in a remote-end computing device OFF4. That is, in the present embodiment, the product database 150 and the behavior analysis unit 170 are disposed in the remote-end computing device OFF4.

According to one embodiment of the disclosure, the physical consumption environment and the network consumption environment may be integrated to provide a tailor-made dynamic pricing service and a brand-new shopping experience with which the physical consumption environment may keep the consumer CM1.

It will be apparent to those skilled in the art that various modifications and variations may be made to the disclosed embodiments. It is intended that the specification and examples be considered as exemplary only, with a true scope of the disclosure being indicated by the following claims and their equivalents.

What is claimed is:
1. A control method of an integrated system of a physical consumption environment and a network consumption environment, comprising:
 obtaining a biological characteristic image of a consumer in the physical consumption environment with an image capture device;
 identifying the biological characteristic image to obtain an identity information from an identity database;
 detecting an activity of the consumer in the physical consumption environment by tracking a sight of the consumer or a location of the consumer in the physical consumption environment with the image capture device, wherein the image capture device identifies an attention or emotion of the consumer towards a product;
 obtaining the product in the physical consumption environment followed by the consumer by estimating a destination of the sight of the consumer or by analyzing the tracked location of the consumer;

obtaining a physical behavior information of the consumer according to the activity of the consumer in the physical consumption environment, including obtaining whether the consumer is following the product according to the tracked sight of the consumer, or obtaining which product category the consumer is following according to the tracked location of the consumer by using the image capture device;

obtaining a network behavior information of the consumer in the network consumption environment according to the identity information; and dynamically adjusting a price of the product in the physical consumption environment for the customer according to an integration of the physical behavior information and the network behavior information, wherein the integration of the physical behavior information and the network behavior information is that the physical behavior information shows that the consumer is interested in the product in the physical consumption environment and the network behavior information shows that the consumer is interested in a product in the network consumption environment, the product in the physical consumption environment and the product in the network consumption environment are different, the physical behavior information comprises a visit frequency, a visit time, a historic consumption record at the physical consumption environment, an age of the consumer or a gender of the consumer, the network behavior information comprises a product that the consumer has ordered at the network consumption environment, a webpage that the consumer has browsed, a key word that the consumer has searched, or a historic consumption record at the network consumption environment.

2. The control method of the integrated system of the physical consumption environment and the network consumption environment according to claim 1, wherein the price is displayed on an electronic label in the physical consumption environment or a mobile device of the consumer.

3. The control method of the integrated system of the physical consumption environment and the network consumption environment according to claim 1, wherein in the step of dynamically adjusting the price of the product, a checkout barcode corresponding to the price, which is dynamically adjusted, is generated.

4. The control method of the integrated system of the physical consumption environment and the network consumption environment according to claim 1, wherein in the step of detecting the activity of the consumer in the physical consumption environment, a sight or a location of the consumer is tracked.

5. The control method of the integrated system of the physical consumption environment and the network consumption environment according to claim 1, wherein the price, which is dynamically adjusted, is kept for a predetermined time.

6. The control method of the integrated system of the physical consumption environment and the network consumption environment according to claim 1, further comprising:

providing a promotional combination according to the physical behavior information and the network behavior information.

7. An integrated system of a physical consumption environment and a network consumption environment, comprising:

an image capture device configured to obtain a biological characteristic image of a consumer in the physical consumption environment;

an identity database;

an identity identification unit configured to identify the biological characteristic image to obtain an identity information from the identity database;

an activity detection unit configured to detect an activity of the consumer in the physical consumption environment by tracking a sight of the consumer or a location of the consumer in the physical consumption environment with the image capture device, wherein the image capture device identifies an attention or emotion of the consumer towards a product;

a product database;

a product identification unit configured to obtain a product in the physical consumption environment followed by the consumer by estimating a destination of the sight of the consumer or by analyzing the tracked location of the consumer from the product database according to the activity of the consumer in the physical consumption environment;

a behavior analysis unit configured to obtain a physical behavior information of the consumer according to the activity of the consumer in the physical consumption environment, wherein the behavior analysis unit obtains whether the consumer is following the product according to the tracked sight of the consumer, or obtains which product category the consumer is following according to the tracked location of the consumer by using the image capture device;

a behavior database configured to provide a network behavior information of the consumer in the network consumption environment according to the identity information; and a dynamic pricing unit configured to dynamically adjust a price of the product in the physical consumption environment for the customer according to an integration of the physical behavior information and the network behavior information, wherein the integration of the physical behavior information and the network behavior information is that the physical behavior information shows that the consumer is interested in the product in the physical consumption environment and the network behavior information shows that the consumer is interested in a product in the network consumption environment, the product in the physical consumption environment and the product in the network consumption environment are different, the physical behavior information comprises a visit frequency, a visit time, a historic consumption record at the physical consumption environment, an age of the consumer or a gender of the consumer, the network behavior information comprises a product that the consumer has ordered at the network consumption environment, a webpage that the consumer has browsed, a key word that the consumer has searched, or a historic consumption record at the network consumption environment.

8. The integrated system of the physical consumption environment and the network consumption environment according to claim 7, wherein the dynamic pricing unit further generates a checkout barcode corresponding to the price, which is dynamically adjusted.

9. The integrated system of the physical consumption environment and the network consumption environment according to claim 7, wherein the dynamic pricing unit displays the price on an electronic label in the physical consumption environment or a mobile device of the consumer.

10. The integrated system of the physical consumption environment and the network consumption environment according to claim 7, wherein the activity detection unit tracks a sight or a location of the consumer.

11. The integrated system of the physical consumption environment and the network consumption environment according to claim 7, wherein the dynamic pricing unit keeps the price, which is dynamically adjusted, for a predetermined time.

12. The integrated system of the physical consumption environment and the network consumption environment according to claim 7, wherein the dynamic pricing unit further provides a promotional combination according to the physical behavior information and the network behavior information.

13. The integrated system of the physical consumption environment and the network consumption environment according to claim 7, wherein the product database is disposed in a remote-end computing device.

14. The integrated system of the physical consumption environment and the network consumption environment according to claim 7, wherein the product database is disposed in a near-end computing device.

15. The integrated system of the physical consumption environment and the network consumption environment according to claim 7, wherein the behavior analysis unit is disposed in a remote-end computing device.

16. The integrated system of the physical consumption environment and the network consumption environment according to claim 7, wherein the behavior analysis unit is disposed in a near-end computing device.

* * * * *